US012196526B2

(12) United States Patent
Keng

(10) Patent No.: US 12,196,526 B2
(45) Date of Patent: Jan. 14, 2025

(54) TOOL AND PISTOL MAGAZINE BASE PLATE

(71) Applicant: MULTITASKER TOOLS LLC, Atlanta, GA (US)

(72) Inventor: Shane Keng, Marietta, GA (US)

(73) Assignee: Multitasker Tools LLC, Atlanta, GA (US)

( * ) Notice: Subject to any disclaimer, the term of this patent is extended or adjusted under 35 U.S.C. 154(b) by 0 days.

(21) Appl. No.: 17/829,787

(22) Filed: Jun. 1, 2022

(65) Prior Publication Data

US 2022/0390203 A1 Dec. 8, 2022

Related U.S. Application Data

(60) Provisional application No. 63/196,003, filed on Jun. 2, 2021.

(51) Int. Cl.
*F41C 27/00* (2006.01)
*B25B 15/02* (2006.01)
*F41A 9/64* (2006.01)

(52) U.S. Cl.
CPC .............. *F41C 27/00* (2013.01); *B25B 15/02* (2013.01); *F41A 9/64* (2013.01)

(58) Field of Classification Search
CPC ................................ F41C 27/00; B25B 12/02
USPC .............................................................. 42/90
See application file for complete search history.

(56) References Cited

U.S. PATENT DOCUMENTS

| | | | | |
|---|---|---|---|---|
| 1,222,458 A | | 4/1917 | Peterson | |
| 4,026,055 A | | 5/1977 | Weast | |
| 4,127,954 A | | 12/1978 | Hausmann | |
| 4,390,927 A | | 6/1983 | Von Feldt | |
| 4,393,614 A | | 7/1983 | Pickett | |
| 4,414,769 A | | 11/1983 | Mueschke | |
| 4,520,585 A | | 6/1985 | Barrett | |
| 4,790,094 A | | 12/1988 | Chesnut et al. | |
| 4,862,620 A | | 9/1989 | Chesnut et al. | |
| 5,144,546 A | | 9/1992 | Burdi | |
| 5,168,629 A | | 12/1992 | Willard | |
| D344,780 S | | 3/1994 | Jenkins | |
| 5,377,437 A | | 1/1995 | Underwood | |
| 5,573,329 A | | 11/1996 | van Gennep | |
| 5,628,555 A | * | 5/1997 | Sharrah ..................... | F41G 1/34 362/114 |
| 5,642,582 A | | 7/1997 | Grams | |
| 5,666,752 A | | 9/1997 | Grams | |
| 5,725,096 A | | 3/1998 | Winnard | |
| 5,768,819 A | | 6/1998 | Neal | |
| 5,802,936 A | | 9/1998 | Liu | |
| D406,508 S | | 3/1999 | Rivera | |
| 5,921,654 A | | 7/1999 | Coyle | |
| 6,269,577 B1 | | 8/2001 | Hardy | |
| 6,279,186 B1 | | 8/2001 | Ge et al. | |
| 6,370,806 B1 | | 4/2002 | Klebes et al. | |
| 6,481,136 B1 | | 11/2002 | Fitzpatrick | |

(Continued)

*Primary Examiner* — Samir Abdosh
(74) *Attorney, Agent, or Firm* — Eversheds Sutherland (US) LLP

(57) ABSTRACT

A magazine baseplate configured to receive a tool and the corresponding tool are described herein. The tool is configured to fit into a tool indention on the bottom side of the magazine baseplate and be secured therein. The tool has a front end and a rear end, each of which has various tools or heads, such as a flathead screwdriver or T10 torx head.

16 Claims, 4 Drawing Sheets

(56) References Cited

U.S. PATENT DOCUMENTS

| | | | | |
|---|---|---|---|---|
| 6,557,287 | B2 | 5/2003 | Wollmann | |
| 6,622,328 | B2 | 9/2003 | Rivera | |
| 6,668,479 | B1 | 12/2003 | Obong | |
| 6,698,127 | B2 | 3/2004 | Weber | |
| 6,739,224 | B1 | 5/2004 | Wershe | |
| 6,751,819 | B2 | 6/2004 | Chuang | |
| 6,862,764 | B2 | 3/2005 | Ping | |
| 6,908,216 | B2 | 6/2005 | Love | |
| 6,948,409 | B2 * | 9/2005 | Ackeret | B26B 11/008 7/128 |
| 7,008,077 | B2 | 3/2006 | Raichlen | |
| 7,117,622 | B2 | 10/2006 | Freed et al. | |
| 7,124,528 | B2 | 10/2006 | Long | |
| 7,146,668 | B2 | 12/2006 | Rivera | |
| 7,197,844 | B2 | 4/2007 | Benson | |
| 7,243,454 | B1 | 7/2007 | Cahill | |
| 7,278,764 | B2 | 10/2007 | Kim | |
| 7,281,397 | B2 | 10/2007 | Victor | |
| 7,478,496 | B2 | 1/2009 | Bender | |
| D593,634 | S | 6/2009 | Fitzpatrick | |
| 7,637,049 | B1 * | 12/2009 | Samson | F41C 23/22 42/108 |
| 7,669,357 | B2 | 3/2010 | Moody et al. | |
| 7,712,399 | B2 | 5/2010 | Nenadic | |
| 7,743,542 | B1 | 6/2010 | Novak | |
| D642,647 | S | 8/2011 | Fitzpatrick et al. | |
| 7,997,170 | B1 | 8/2011 | Martinez et al. | |
| 8,087,115 | B2 | 1/2012 | Barber et al. | |
| 8,127,480 | B1 | 3/2012 | McManus et al. | |
| 8,196,504 | B2 | 6/2012 | Keng | |
| 8,316,492 | B2 | 11/2012 | Barber et al. | |
| D680,613 | S | 4/2013 | Fitzpatrick et al. | |
| 8,418,390 | B1 | 4/2013 | Wright | |
| 8,590,202 | B2 | 11/2013 | Keng | |
| 8,590,203 | B1 | 11/2013 | McCarthy et al. | |
| 8,650,791 | B2 | 2/2014 | Williams | |
| D706,895 | S | 6/2014 | Zayatz et al. | |
| 8,898,949 | B1 | 12/2014 | Greenwood | |
| D725,218 | S | 3/2015 | Losilevsky | |
| 9,097,480 | B2 * | 8/2015 | Keng | F41A 23/08 |
| 9,228,797 | B2 | 1/2016 | Anderson et al. | |
| 9,234,722 | B2 | 1/2016 | Rice et al. | |
| 9,387,575 | B2 * | 7/2016 | Wei | B25B 15/00 |
| 9,623,546 | B2 | 4/2017 | Keng | |
| 9,945,627 | B2 * | 4/2018 | Porat | F41A 9/65 |
| 10,126,076 | B2 * | 11/2018 | Klein | F41A 9/63 |
| 10,161,705 | B2 * | 12/2018 | Keng | F41A 23/04 |
| 10,184,746 | B1 | 1/2019 | Liu | |
| 10,190,840 | B1 | 1/2019 | Renteria | |
| 10,247,520 | B2 * | 4/2019 | Manly | F41B 13/08 |
| 10,401,114 | B2 | 9/2019 | Floyd | |
| 10,684,089 | B2 * | 6/2020 | Keng | F41A 9/65 |
| 10,948,255 | B2 * | 3/2021 | Keng | F41A 23/04 |
| D989,907 | S * | 6/2023 | Ding | D22/108 |
| 2002/0029506 | A1 | 3/2002 | Wollmann | |
| 2003/0037474 | A1 * | 2/2003 | Weber | F41C 23/12 42/71.02 |
| 2004/0141313 | A1 | 7/2004 | Elsener | |
| 2005/0011097 | A1 | 1/2005 | Freed et al. | |
| 2005/0011104 | A1 | 1/2005 | Oz | |
| 2006/0164846 | A1 | 7/2006 | Kim | |
| 2006/0262518 | A1 | 11/2006 | Thuma et al. | |
| 2008/0190003 | A1 | 8/2008 | Bolen | |
| 2009/0000038 | A1 | 1/2009 | Padden | |
| 2009/0235569 | A1 | 9/2009 | Morando | |
| 2010/0043270 | A1 | 2/2010 | Mantas | |
| 2010/0154275 | A1 | 6/2010 | Faifer | |
| 2011/0173858 | A1 | 7/2011 | Troy | |
| 2011/0283582 | A1 | 11/2011 | Hunter et al. | |
| 2012/0073429 | A1 | 3/2012 | Bowles et al. | |
| 2012/0085013 | A1 | 4/2012 | Cahill | |
| 2012/0137564 | A1 | 6/2012 | Swenson, III et al. | |
| 2012/0167430 | A1 | 7/2012 | Freed | |
| 2012/0174452 | A1 | 7/2012 | Anderson et al. | |
| 2012/0180360 | A1 | 7/2012 | Jones | |
| 2012/0198746 | A1 | 8/2012 | Keng | |
| 2012/0255979 | A1 | 10/2012 | Sitz | |
| 2013/0025071 | A1 | 1/2013 | Keng | |
| 2013/0086834 | A1 | 4/2013 | Battaglia | |
| 2013/0145672 | A1 | 6/2013 | Tuller, Jr. et al. | |
| 2013/0227870 | A1 | 9/2013 | Rendulic | |
| 2013/0333261 | A1 * | 12/2013 | Clifton, Jr. | F41A 9/65 42/50 |
| 2014/0033592 | A1 | 2/2014 | Fiorucci | |
| 2014/0047751 | A1 | 2/2014 | Lee | |
| 2014/0047755 | A1 | 2/2014 | McClintock | |
| 2014/0068992 | A1 | 3/2014 | Keng | |
| 2014/0196349 | A1 | 7/2014 | Rogers et al. | |
| 2014/0305019 | A1 | 10/2014 | King, Jr. | |
| 2014/0338245 | A1 | 11/2014 | Lanasa et al. | |
| 2015/0121736 | A1 | 5/2015 | Faifer | |
| 2015/0330740 | A1 | 11/2015 | Wei | |
| 2016/0069637 | A1 | 3/2016 | Kafer | |
| 2016/0097614 | A1 * | 4/2016 | Manly | F41G 11/001 42/90 |
| 2016/0265872 | A1 | 9/2016 | Tarazi | |
| 2016/0363407 | A1 | 12/2016 | Hanington | |
| 2017/0160038 | A1 * | 6/2017 | Keng | F41A 23/04 |
| 2017/0254613 | A1 | 9/2017 | Kedairy | |
| 2019/0226778 | A1 * | 7/2019 | Cross | F41A 9/63 |
| 2019/0390936 | A1 * | 12/2019 | Keng | F41C 23/22 |
| 2021/0231402 | A1 * | 7/2021 | Morris | F41A 35/00 |
| 2022/0390203 | A1 * | 12/2022 | Keng | B25B 15/02 |

* cited by examiner

TOOL AND PISTOL MAGAZINE BASE PLATE

CROSS REFERENCE TO RELATED APPLICATIONS

This application claims benefit of priority to U.S. Provisional Patent Application No. 63/196,003 filed Jun. 2, 2021, which is incorporated hereby by reference in their entirety.

FIELD OF THE DISCLOSURE

The disclosure relates to magazine base attachments for firearms.

BACKGROUND

It is an advantage to use a magazine baseplate when shooting or handling a firearm. Magazine baseplates can be used for comfort, adding extra grip surface area, preventing scratching or wear, locking the insert and spring mag into place, or allowing a magazine to stand up.

While these devices accomplish these tasks and others, they can add a significant amount of additional weight and bulk in order to provide the desired function. Likewise, said devices require some form of manipulation by the user prior to being used. Furthermore, due to the complexity of the parts or materials used, the cost of manufacturing can be quite high. Accordingly, there exists a need in the art for a low cost and reliable magazine baseplate Firearm accessories generally include modifications for different parts such as the barrel, stock, slide, or sight. The accessories will modify the accuracy of the firearm, improve the weight of the firearm, or allow the firearm to be easier to take apart. One problem with firearms is a lack of storage. Creating convenient and lightweight storage space for tools on a firearm is desirable because having quick access to firearm tools is important if the firearm jams or malfunctions in some other way. Accordingly, there exists a need in the art for a lightweight and convenient storage space accessory for a firearm.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

According to an embodiment, an aspect of the disclosure is to provide a stable magazine base plate that allows storage of a tool on the bottom without compromising the flat resting surface. The magazine base plate improves upon the prior art by allowing storage on the bottom, and being smaller, lighter, and cheaper to manufacture.

Figure 1A:
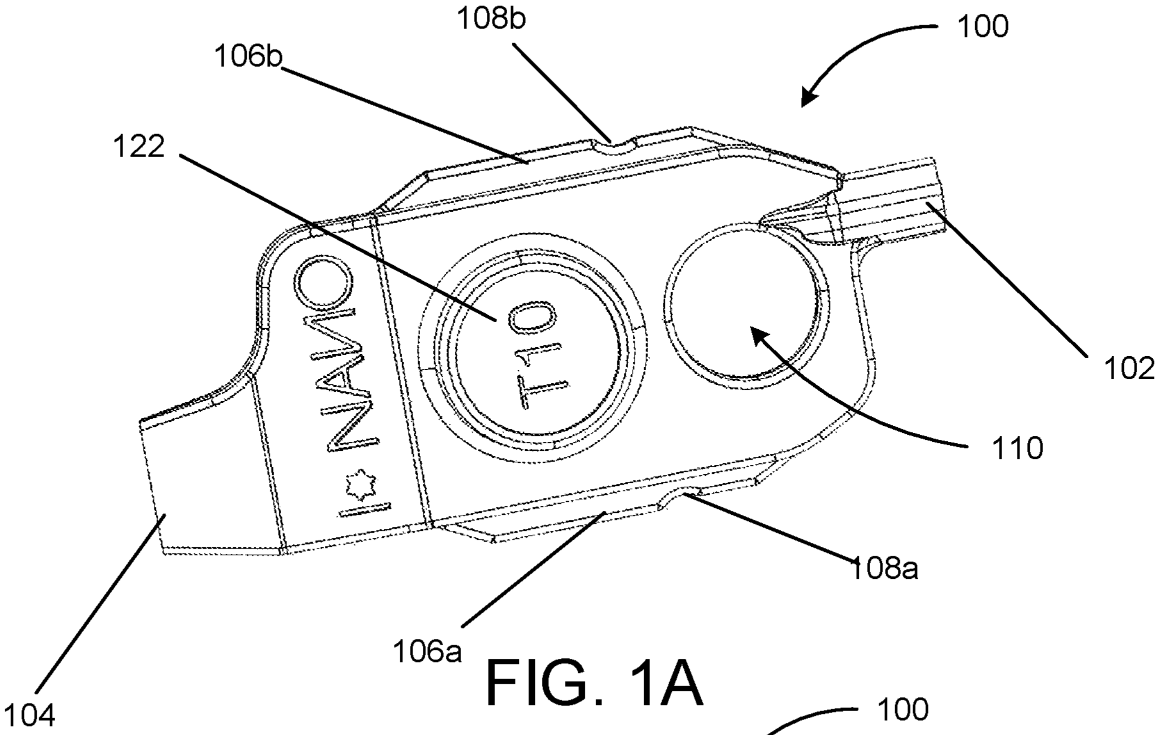
FIG. 1A depicts a front side view of a tool in accordance with one or more embodiments of the disclosure.
Figure 1B:
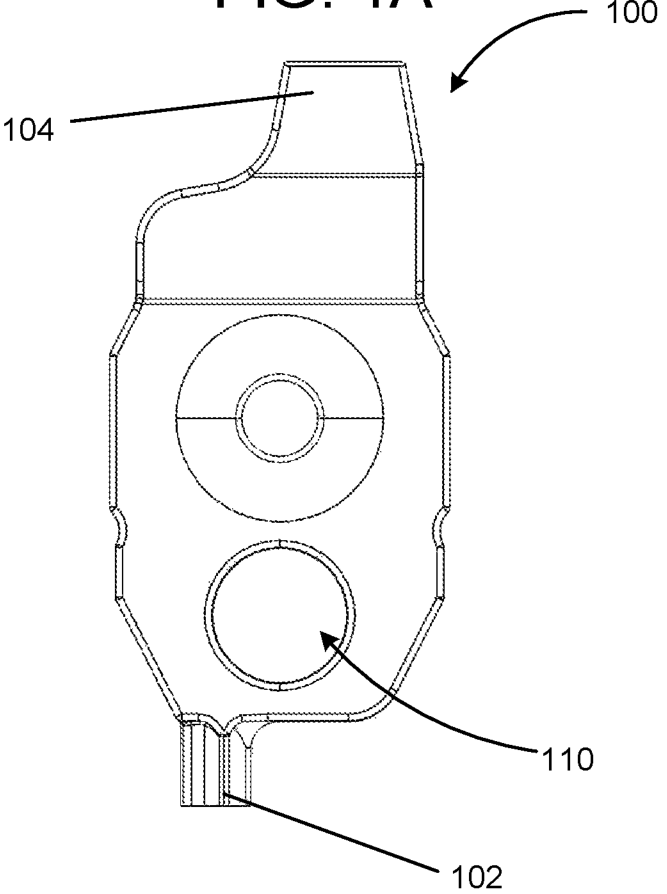
FIG. 1B depicts a rear side view of a tool in accordance with one or more embodiments of the disclosure.
Figure 2:
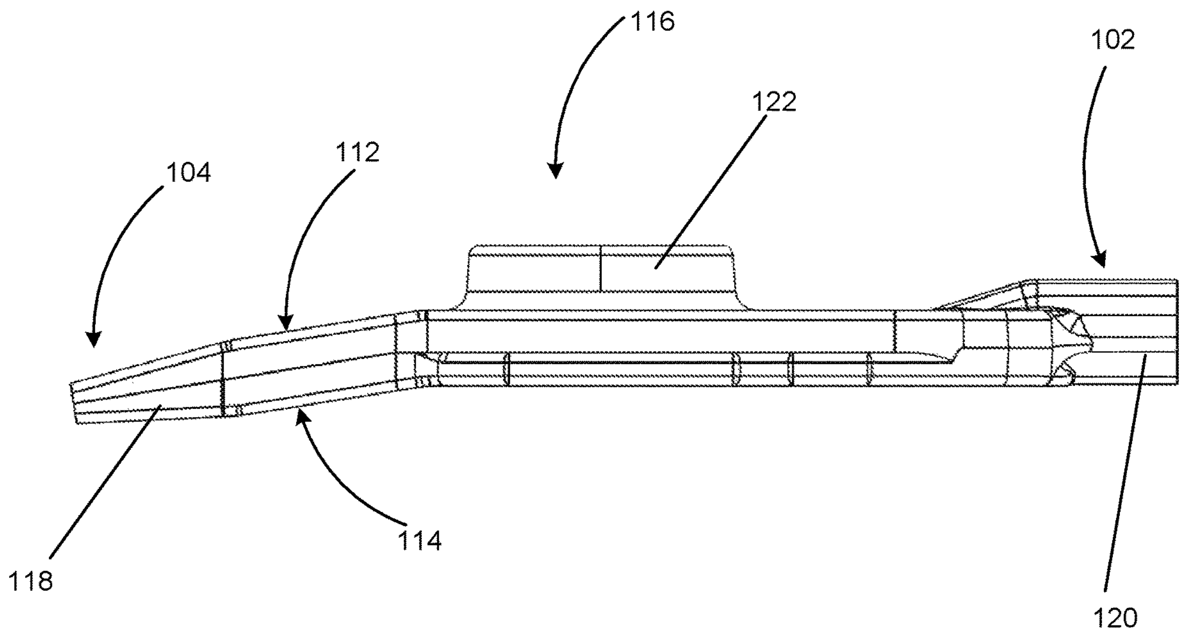
FIG. 2 depicts a side view of a tool in accordance with one or more embodiments of the disclosure.

FIGS. 1 and 2 depict a tool 100. The tool 100 may include an angled (or sloped) front end 104 and a rear end 102. The tool also can include a fin 106*a*, 106*b* on each side of the tool 100, each fin 106*a*, 106*b* may include a recess portion 108*a*, 108*b*. The fins 106*a*, 106*b* may be tapered toward the front end 104 and rear end 102 to guide the fins into the recess portion. The tool may also comprise an aperture 110 for other tools or lanyards to connect to. The tool can be in the engaged position whereby it is secured to a firearm magazine base plate, as shown in FIGS. 3A-3D.

Figure 3A:
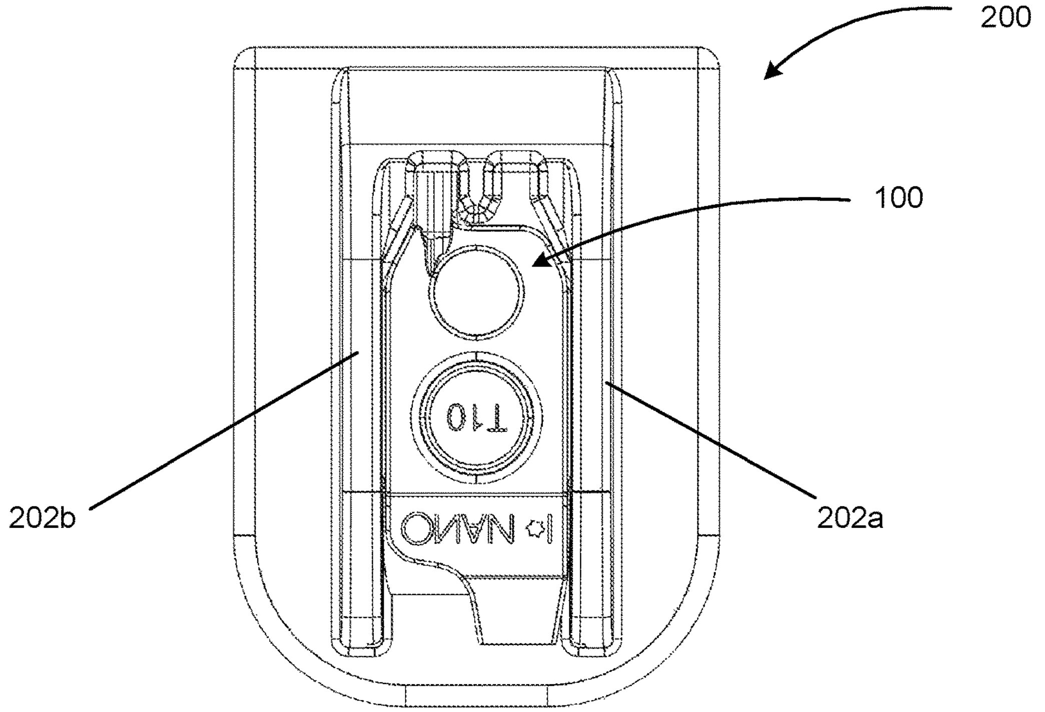
FIG. 3A depicts a bottom view of a firearm magazine baseplate with the tool in the engaged position in accordance with one or more embodiments of the disclosure.

FIG. 3A is a bottom view of a firearm magazine baseplate 200 with the tool 100 in the engaged position in accordance with one or more embodiments of the disclosure. Some embodiments of the firearm magazine baseplate include a tool indention or recess 212 configured to receive the removable tool 100. For example, the tool indention 212 may have two opposing ridges 202 configured to protect the removable tool from accidental damage or removal. For instance, many forces and obstacles may impact a firearm baseplate during when the associated firearm is in use, and a tool 100 embedded on the exterior of a firearm may be subject to accidental detachment, thus securing the tool 100 in the tool indention 212 may increase the likelihood of preventing accidental detachment of the tool 100. In some instances, the tool indention 212 may fit the shape of the removable tool. In some embodiments, the tool indention 212 includes two side walls 214*a*, 214*b*, an open end 218, and an oblong protrusion 216. In other instances, the tool indention 212 may be configured to suit another removable tool. The magazine baseplate 200 can comprise two ridges 202*a*, 202*b* configured to define corresponding slots 206*a*, 206*b* that receive the opposing fins 106*a*, 106*b*. The ridges 202*a*, 202*b* may store the tool 100 and provide a flat base for the magazine. The ridges 202*a*, 202*b* may have one or more of a rounded portion 224, a flat portion 222 substantially parallel to the baseplate body, a first angled portion 220, and a second angled portion 223 between the flat portion 222 and rounded portion 224. These plurality of portions of the ridges 202*a*, 202*b* may each have different angles or configurations. Each portion may be used for stabilizing the firearm with which the magazine is being used with respect to different surface types.

Figure 3B:
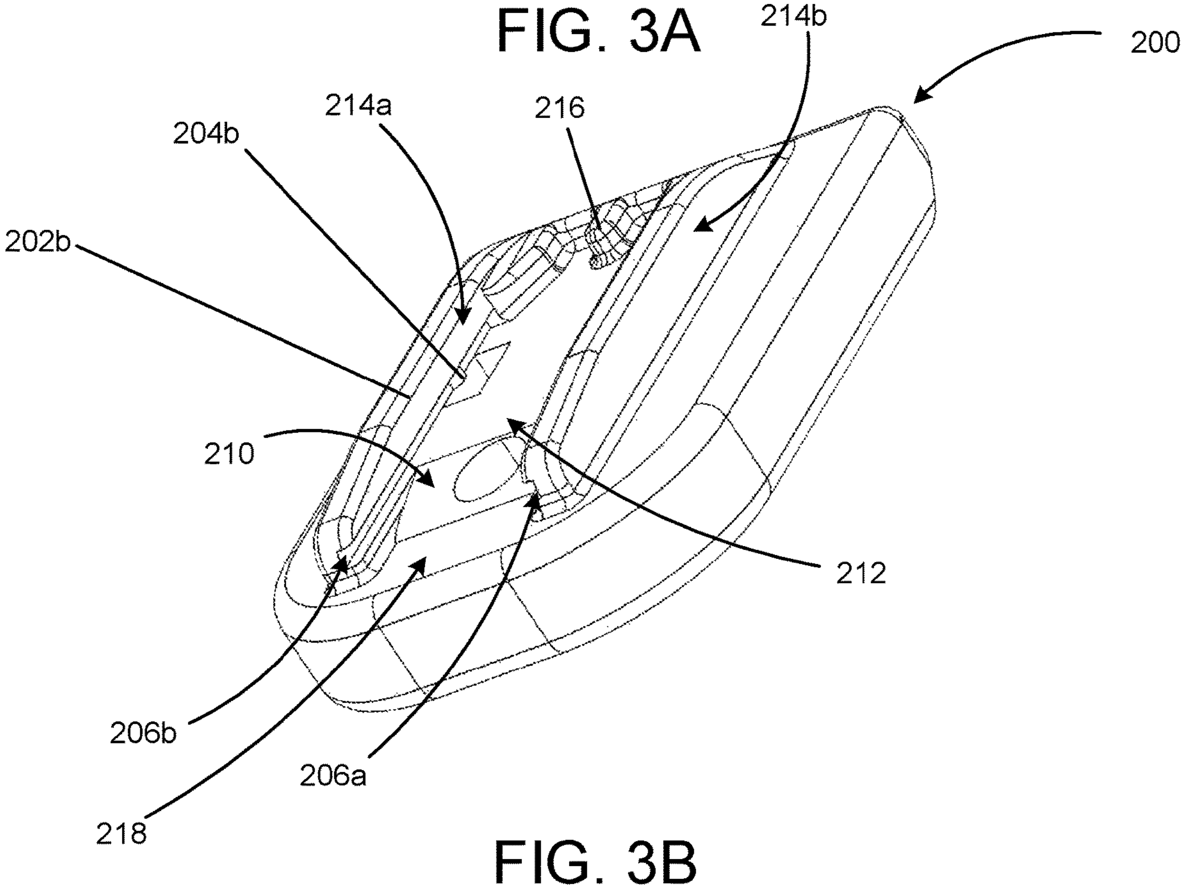
FIGS. 3B and 3C depicts perspective views of a firearm magazine baseplate in accordance with one or more embodiments of the disclosure.
Figure 3C:
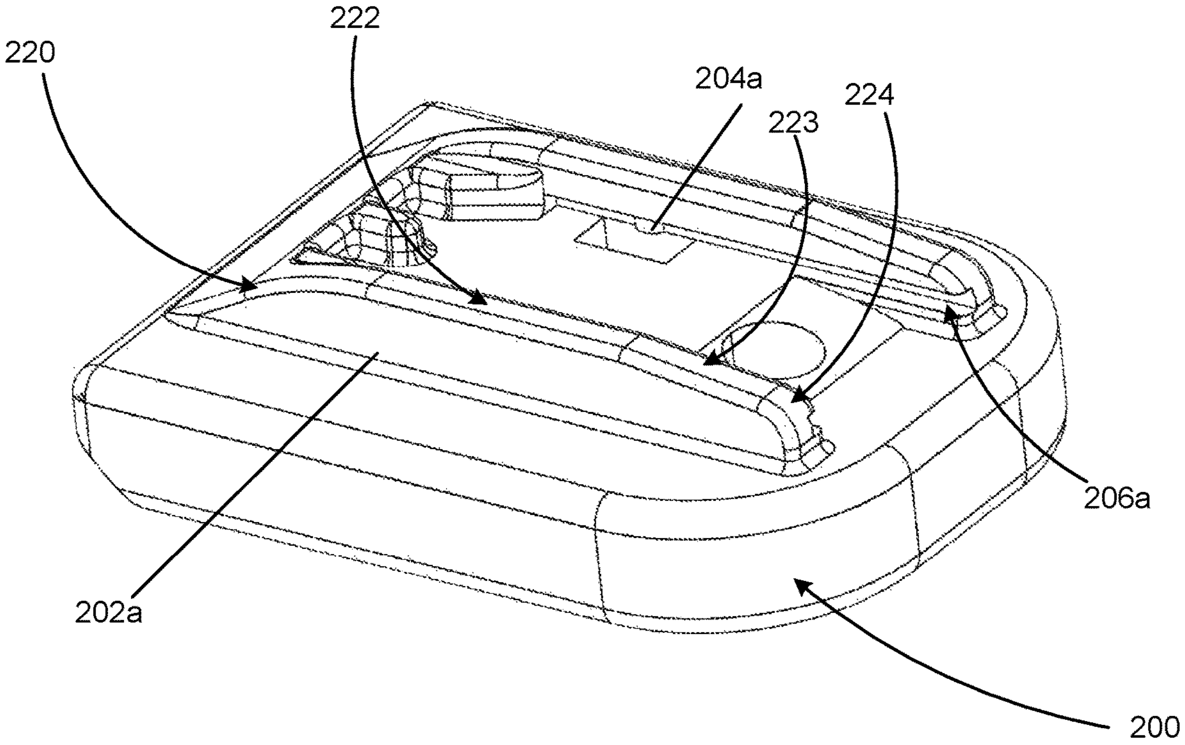
Figure 3D:
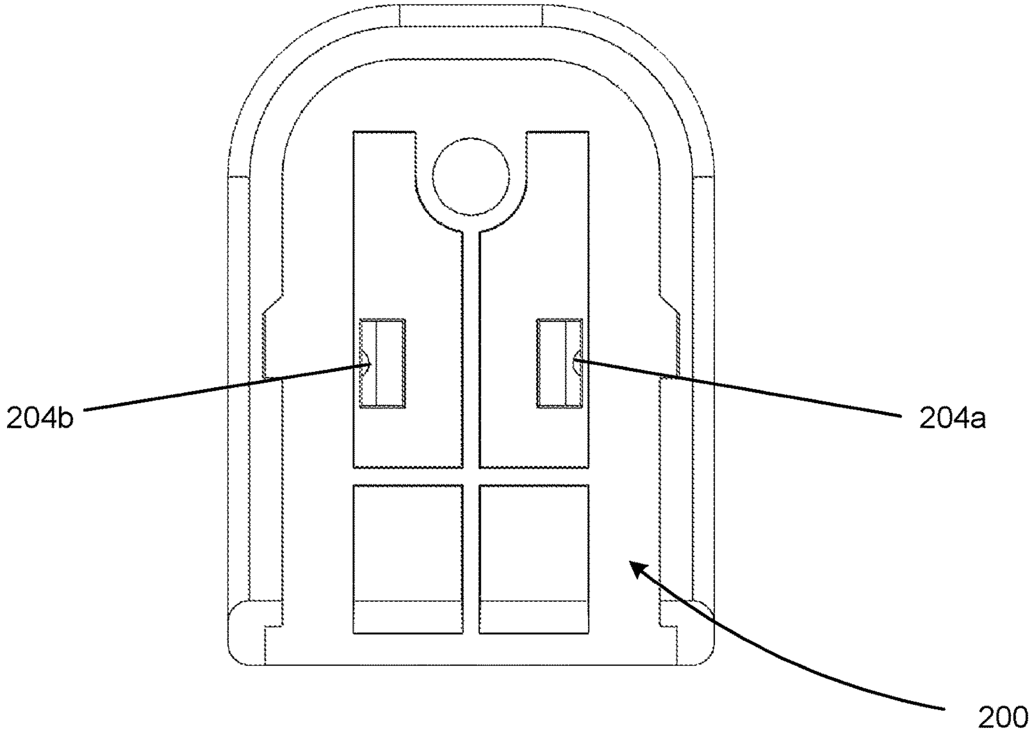
FIG. 3D depicts a top view of a firearm magazine baseplate in accordance with one or more embodiments of the disclosure.

FIGS. 3B and 3C are perspectives view of a firearm magazine baseplate 200 with the tool 100 in the disengaged position in accordance with one or more embodiments of the disclosure. The ridges 202*a*, 202*b* comprise a fastener, such as detent or protrusions 204*a*, 204*b* to fit into the recess 108*a*, 108*b* of the tool 100 to hold the tool 100 in the engaged position. The slots 206*a*, 206*b* defined by the ridges 202*a*, 202*b* may guide the fins 106*a*, 106*b* into the engaged position. Some embodiments may have a sloped surface 210 of the magazine plate to accommodate the slope of the first end 104. The indention 212 further has a protrusion 216 opposite the open end 218. The protrusion 216 is disposed such that frictional pressure of the protrusion 216, side wall 214*a*, and second end 102 holds the tool 100 in place. If the second end 102 has a tool head closer to the other side wall 214*b*, frictional pressure of the protrusion 216, other side wall 214*b*, and second end 102 may hold the tool 100 in place instead, preventing dislodging from the baseplate.

In some embodiments, as shown in FIG. 3A, within the tool indention rests a removable tool 100. The removable tool, as seen in FIGS. 1-2, includes a top side 112, an opposing bottom side 114, a first end 104, a second end 102, and a middle portion 116. In some instances, the removable tool 100 may include a plurality of tools heads disposed on each side. For example, the removable tool 100 may include a flathead screwdriver 118 on one end of the removable tool and a T10 torx head 120 on the opposing side. The second end 102 (and/or the first end 104) may include additional nubs on the second end 102 The removable tool 100 may include a variety of different tooling at one or both ends 102, 104, such as hex keys, punches, screwdrivers, wrenches ruler, optic adjustment tool, scope ring tool, level, knife, or some other tool disposed on one end or both of the removable tool 100. In some embodiments, the removable tool 100 includes a protruding lip 122 configured to help a user pull the removable tool from the engaged position. In some instances, the protruding lip 122 may be donut-shaped.

The removable tool 100 may include a variety of different tooling, such as hex keys, punches, screwdrivers, wrenches, ruler, scope ring tool, level, or some other tool disposed on one end of the removable tool 100.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed:

1. A magazine base plate configured to receive a tool, comprising;
- a top side, wherein the top side engages the magazine; and
- a bottom side, wherein the bottom side comprises:
  - a tool indention;
  - at least one ridge forming a side of the tool indention, the at least one ridge comprising a fastener; and
- a tool, wherein the tool comprises:
  - a top side, a bottom side, a front end, a middle portion, and a rear end;
  - at least one fin extending along at least one side of the middle portion, the at least one fin comprising a recess portion along the fin configured to receive the fastener;
- wherein the front end comprise a first tool and the rear end comprises a second tool.

2. The magazine base plate of claim 1, wherein the fastener is a protrusion.

3. The magazine base plate of claim 2, wherein the fastener is a detent.

4. The magazine base plate of claim 1, wherein the tool comprises a first fin along a first side of the middle portion and a second fin along a second side of the middle portion.

5. The magazine base plate of claim 4, wherein the first fin is tapered.

6. The magazine base plate of claim 4, wherein the recess portion is disposed toward the rear end of the tool.

7. The magazine base plate of claim 1, wherein the middle portion of the top side of the tool comprises a protruding lip.

8. The magazine base plate of claim 1, wherein the rear end comprises a T10 torx head.

9. The magazine base plate of claim 1, wherein the front end comprises a flathead screwdriver.

10. The magazine base plate of claim 1, wherein the front end of the tool is angled.

11. A tool configured to be inserted into a tool indention of a magazine base plate, comprising:
- a top side, a bottom side, a front end, a middle portion, and a rear end;
- at least one fin extending along at least one side of the middle portion, the at least one fin comprising a recess portion along an edge of the fin configured to receive at least one fastener of the magazine base plate;
- wherein the front end comprise a first tool and the rear end comprises a second tool.

12. The tool of claim 11, wherein the front end is angled.

13. The tool of claim 12, wherein the front end comprises a flathead screwdriver.

14. The tool of claim 13, wherein the rear end comprises a T10 torx head.

15. The tool of claim 11, wherein the middle portion of the top side comprises a protruding lip.

16. The tool of claim 11, wherein the middle portion further comprises an aperture extending from the top side to the bottom side.

* * * * *